United States Patent
Noma et al.

(10) Patent No.: US 11,673,351 B2
(45) Date of Patent: Jun. 13, 2023

(54) METHOD FOR MANUFACTURING STRUCTURE, METHOD FOR PREPARING SKIN MATERIAL, AND METHOD FOR SETTING HEATING CONDITION FOR SKIN MATERIAL

(71) Applicant: MITSUBISHI HEAVY INDUSTRIES, LTD., Tokyo (JP)

(72) Inventors: Kazuki Noma, Tokyo (JP); Masayuki Yamashita, Tokyo (JP); Masayuki Kanemasu, Tokyo (JP); Mikoto Omori, Tokyo (JP); Hiromichi Akiyama, Tokyo (JP); Toshio Kozasa, Tokyo (JP); Shunichi Morishima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 429 days.

(21) Appl. No.: 16/757,443

(22) PCT Filed: May 10, 2018

(86) PCT No.: PCT/JP2018/018193
§ 371 (c)(1),
(2) Date: Apr. 20, 2020

(87) PCT Pub. No.: WO2019/087440
PCT Pub. Date: May 9, 2019

(65) Prior Publication Data
US 2021/0187877 A1    Jun. 24, 2021

(30) Foreign Application Priority Data
Nov. 1, 2017    (JP) .............................. JP2017-211676

(51) Int. Cl.
*B29C 70/00*    (2006.01)
*B32B 3/00*    (2006.01)
(Continued)

(52) U.S. Cl.
CPC ................ *B29C 70/44* (2013.01); *B32B 3/12* (2013.01); *B32B 5/02* (2013.01); *B32B 7/12* (2013.01);
(Continued)

(58) Field of Classification Search
CPC .. B29C 70/44; B32B 3/12; B32B 5/02; B32B 7/12; B32B 37/065; B32B 37/1018;
(Continued)

(56) References Cited

U.S. PATENT DOCUMENTS

| | | | |
|---|---|---|---|
| 10,647,849 B2 | 5/2020 | Kaneko et al. | |
| 2012/0048487 A1* | 3/2012 | Brewster | E04B 9/045 428/116 |
| 2013/0075193 A1 | 3/2013 | Vavalle | |

FOREIGN PATENT DOCUMENTS

| | | | |
|---|---|---|---|
| JP | H06190955 A | | 7/1994 |
| JP | 2005022171 | * | 1/2005 |

(Continued)

OTHER PUBLICATIONS

English machine translation of JP2005022171; Jan. 2005; Muraki; 6 pages. (Year: 2005).*

(Continued)

*Primary Examiner* — Linda L Gray
(74) *Attorney, Agent, or Firm* — Hauptman Ham, LLP (57) ABSTRACT

A method is for manufacturing a honeycomb structure including a core material in which a hole is formed to penetrate in a thickness direction and is arranged in a plane direction, and a skin material that is stacked on a surface of the core material. The skin material includes a thermosetting (Continued)

resin. The method includes half-curing the thermosetting resin by placing the skin material in a bag and heating the skin material in a state where an inside of the bag is evacuated and an outside of the bag is under an atmospheric pressure; stacking the skin material in which the thermosetting resin is half-cured onto a side of the surface of the core material; and bonding and integrating the core material and the skin material with each other by pressurizing and heating the stacked core material and skin material with the use of a sealing pressurizing heating facility.

3 Claims, 7 Drawing Sheets (51) Int. Cl.
| B32B 5/00 | (2006.01) |
| B32B 7/00 | (2019.01) |
| B32B 37/00 | (2006.01) |
| B29C 70/44 | (2006.01) |
| B32B 3/12 | (2006.01) |
| B32B 5/02 | (2006.01) |
| B32B 7/12 | (2006.01) |
| B32B 37/06 | (2006.01) |
| B32B 37/10 | (2006.01) |
| B32B 37/12 | (2006.01) |
| B32B 37/14 | (2006.01) |
| B29K 63/00 | (2006.01) |
| B29K 307/04 | (2006.01) |

(52) U.S. Cl.
CPC ........ *B32B 37/065* (2013.01); *B32B 37/1018* (2013.01); *B32B 37/12* (2013.01); *B32B 37/146* (2013.01); *B29K 2063/00* (2013.01); *B29K 2307/04* (2013.01); *B32B 2250/40* (2013.01); *B32B 2260/023* (2013.01); *B32B 2260/046* (2013.01); *B32B 2262/106* (2013.01); *B32B 2305/076* (2013.01)

(58) Field of Classification Search
CPC .............. B32B 37/146; B29K 2063/00; B29K 2307/04; B29K 2250/40; B29K 2260/023; B29K 2260/046; B29K 2262/106; B29K 2305/076
See application file for complete search history.

(56) References Cited

FOREIGN PATENT DOCUMENTS

| JP | 2005022171 A | 1/2005 |
| JP | 2005047180 A | 2/2005 |
| JP | 2013522511 A | 6/2013 |
| JP | 2016112844 A | 6/2016 |
| WO | 2016159147 A1 | 10/2016 |

OTHER PUBLICATIONS

International Search Report and Written Opinion of International Application No. PCT/JP2018/018193 dated Jul. 31, 2018; 6pp.
Office Action for Japanese Application No. 2017211676 dated Jul. 27, 2021; 8pp.
Partial Supplementary European Search Report for European Application No. 18872760.6 dated Nov. 16, 2020;11pp.

* cited by examiner

METHOD FOR MANUFACTURING STRUCTURE, METHOD FOR PREPARING SKIN MATERIAL, AND METHOD FOR SETTING HEATING CONDITION FOR SKIN MATERIAL

RELATED APPLICATIONS

The present application is a National Phase of International Application Number PCT/JP2018/018193 filed May 10, 2018 and claims priority of Japanese Application Number 2017-211676 filed Nov. 1, 2017.

TECHNICAL FIELD

The present invention relates to a method for manufacturing a structure, a method for preparing a skin material, and a method for setting a heating condition for a skin material.

BACKGROUND ART

A composite material that includes a reinforced fiber into which a thermosetting resin is infiltrated is known as a material that is light and has high strength. The composite material is used in an aircraft, an automobile, and a ship. In order to enhance the strength of a core material having a variety of properties, a method, in which the composite material is bonded to a surface of the core material as a skin material and is used as a structure, is known (refer to PTL 1).

CITATION LIST

Patent Literature

[PTL 1] Japanese Unexamined Patent Application Publication No. 2005-022171

SUMMARY OF INVENTION

Technical Problem

In the method of PTL 1, the core material and the skin material are pressurized by a pressurizing source with the use of a sealing pressurizing heating facility of which an inside is evacuated, and a temperature of the sealing pressurizing heating facility is increased to a curing temperature of a thermosetting resin and is maintained for a certain amount of time, such that the thermosetting resin is cured and bonded. Consequently, a structure with a high molding quality is obtained. A vacuum sealing facility disclosed in PTL 1 and an autoclave facility that heats and pressurizes an inside thereof by increasing a pressure thereof with a gas can be given as examples of the sealing pressurizing heating facility.

However, there is a possibility of a molding failure according to properties of the core material and the skin material in the method of PTL 1. For example, in a case where a honeycomb structural material formed by holes penetrating the core material in a thickness direction and being arranged in a plane direction is used, there is a possibility that the skin material causes sinking (dimple) to occur toward the holes of the core material as the skin material deforms under a high pressure and a high temperature.

In addition, in order to reduce the possibility of the molding failure, a method of first, pressurizing and heating only the skin material with the use of the sealing pressurizing heating facility and next bonding the pressurized and heated skin material and the core material to each other by performing pressurizing and heating with the use of the sealing pressurizing heating facility in manufacturing one structure is adopted. Herein, the method of pressurizing and heating with the use of the sealing pressurizing heating facility requires a long time for one time of performing and requires high costs for one time of performing. For this reason, performing the method of pressurizing and heating with the use of the sealing pressurizing heating facility two times in manufacturing one structure has a problem of a significant decrease in a manufacturing efficiency. Thus, when heating is performed without using the sealing pressurizing heating facility and without pressurization in order to reduce costs, there is a possibility that the skin material generates pores (voids) as the skin material generates a volatile component in a case where the thermosetting resin included in the skin material generates the volatile component.

The present invention is devised in view of the circumstances, and an object thereof is to provide a method for manufacturing a structure, a method for preparing a skin material, and a method for setting a heating condition for a skin material, which allow manufacturing of a high-quality structure by suitably bonding a core material and a skin material to each other without significantly decreasing a manufacturing efficiency.

Solution to Problem

According to an aspect of the invention, in order to solve the problem described above and to achieve the object, there is provided a method for manufacturing a structure including a core material that is a honeycomb structural material, in which a hole is formed to penetrate in a thickness direction and is arranged in a plane direction, and a skin material that is stacked on a surface of the core material. The skin material includes a thermosetting resin. The method includes a vacuum heating step of half-curing the thermosetting resin by placing the skin material in a bag and heating the skin material in a state where an inside of the bag is evacuated and an outside of the bag is under an atmospheric pressure, a stacking step of stacking the skin material in which the thermosetting resin is half-cured onto a side of the surface of the core material, and a sealing pressurizing heating step of bonding and integrating the core material and the skin material with each other by pressurizing and heating the stacked core material and skin material with the use of a sealing pressurizing heating facility.

In the configuration, since the vacuum heating step of half-curing the thermosetting resin by placing the skin material in the bag, making the inside of the bag evacuated, heating the outside of the bag under the atmospheric pressure is included, and only one time of the sealing pressurizing heating step of performing pressurizing and heating with the use of the sealing pressurizing heating facility is included in manufacturing one structure, the core material and the skin material can be suitably bonded to each other without significantly decreasing a manufacturing efficiency, and the high-quality structure that includes the light and highly rigid honeycomb structural material and can reduce a possibility of occurrence of sinking (dimple) in the skin material can be manufactured.

In the configuration, it is preferable that the thermosetting resin contains a first volatile component generated in a region of a temperature lower than a curing temperature at which the thermosetting resin is cured. It is preferable for the vacuum heating step to include a first vacuum heating step of generating and removing the first volatile component from the skin material by heating the skin material for a predetermined time in the region of a low temperature and a second vacuum heating step of half-curing the thermosetting resin from which the first volatile component is removed by further heating the skin material after the first vacuum heating step. In the configuration, since there is included the first vacuum heating step of removing the first volatile component from the skin material by placing the skin material in the bag and heating the skin material in a state where the inside of the bag is evacuated and the outside of the bag is under the atmospheric pressure for a predetermined time in the region of a low temperature in a case where the thermosetting resin contains the first volatile component generated in the region of a temperature lower than the curing temperature at which the thermosetting resin is cured, the core material and the skin material can be suitably bonded to each other without significantly decreasing a manufacturing efficiency, and the high-quality structure that can reduce a possibility of generation of pores (voids) in the skin material can be manufactured.

According to another aspect of the invention, in order to solve the problem described above and to achieve the object, there is provided a method for manufacturing a structure including a core material and a skin material stacked on a surface of the core material. The skin material includes a thermosetting resin containing a first volatile component generated in a region of a temperature lower than a curing temperature at which the thermosetting resin is cured. The method includes a first vacuum heating step of generating and removing the first volatile component from the skin material by placing the skin material in a bag and heating the skin material in a state where an inside of the bag is evacuated and an outside of the bag is under an atmospheric pressure for a predetermined time in the region of a low temperature, a second vacuum heating step of half-curing the thermosetting resin from which the first volatile component is removed by placing the skin material in the bag and heating the skin material in a state where the inside of the bag is evacuated and the outside of the bag is under the atmospheric pressure after the first vacuum heating step, a stacking step of stacking the skin material in which the thermosetting resin is half-cured onto a side of the surface of the core material, and a sealing pressurizing heating step of bonding and integrating the core material and the skin material with each other by pressurizing and heating the stacked core material and skin material with the use of a sealing pressurizing heating facility.

In the configuration, since there is included the first vacuum heating step of removing the first volatile component from the skin material by placing the skin material in the bag and heating the skin material in a state where the inside of the bag is evacuated and the outside of the bag is under the atmospheric pressure for a predetermined time in the region of a low temperature in a case where the thermosetting resin contains the first volatile component generated in the region of a temperature lower than the curing temperature at which the thermosetting resin is cured, and only one time of the sealing pressurizing heating step of performing pressurizing and heating with the use of the sealing pressurizing heating facility is included in manufacturing one structure, the core material and the skin material can be suitably bonded to each other without significantly decreasing a manufacturing efficiency regardless of the fact that whether or not the hole is formed in the surface of the core material, and the high-quality structure that can reduce a possibility of generation of pores (voids) in the skin material can be manufactured.

In the configuration including the first vacuum heating step and the second vacuum heating step, it is preferable that the thermosetting resin further contains a second volatile component generated in a region of a high temperature including the curing temperature, and in the second vacuum heating step, the thermosetting resin from which the first volatile component is removed is half-cured by heating the skin material at a temperature that is equal to or lower than the curing temperature. In the configuration, in a case where the thermosetting resin contains the second volatile component generated in the region of a high temperature including the curing temperature, the skin material can be half-cured in a state where the second volatile component is not generated since the skin material is placed in the bag, the inside of the bag is evacuated, the outside of the bag is heated under the atmospheric pressure at the temperature that is equal to or lower than the curing temperature in the second vacuum heating step. Therefore, the core material and the skin material can be suitably bonded to each other without significantly decreasing a manufacturing efficiency, and the high-quality structure that can reduce a possibility of generation of pores (voids) in the skin material can be manufactured.

In the configuration including the first vacuum heating step and the second vacuum heating step, it is preferable that heating conditions of the first vacuum heating step and the second vacuum heating step are set based on a determination result in which whether or not the thermosetting resin contains the first volatile component generated in the region of a temperature lower than the curing temperature at which the thermosetting resin is cured is determined and a determination result in which whether or not the thermosetting resin contains a second volatile component generated in a region of a high temperature including the curing temperature is determined, by performing thermal gravimetric analysis on the thermosetting resin. In the configuration, since the heating conditions of the first vacuum heating step and the second vacuum heating step are optimized based on the two determination results obtained by performing thermal gravimetric analysis on the thermosetting resin, the high-quality structure that can reduce a possibility of generation of pores (voids) in the skin material can be manufactured.

In the configuration, it is preferable that in the stacking step, the skin material in which the thermosetting resin is half-cured is stacked onto the side of the surface of the core material via a film-like adhesive layer, and in the sealing pressurizing heating step, the core material and the skin material are bonded and integrated with each other by the adhesive layer. In the configuration, since the core material and the skin material are bonded to each other via the film-like adhesive layer, various structures in which variations of the core material and the skin material are widened can be obtained.

According to another aspect of the invention, in order to solve the problem described above and to achieve the object, there is provided a method for preparing a skin material in manufacturing a structure including a core material and the skin material stacked on a surface of the core material. The skin material includes a thermosetting resin containing a first volatile component generated in a region of a temperature lower than a curing temperature at which the thermosetting resin is cured. The method includes a first vacuum heating step of generating and removing the first volatile component from the skin material by placing the skin material in a bag and heating the skin material in a state where an inside of the bag is evacuated and an outside of the bag is under an atmospheric pressure for a predetermined time in the region of a temperature lower than the curing temperature at which the thermosetting resin is cured and a second vacuum heating step of half-curing the thermosetting resin from which the first volatile component is removed by placing the skin material in the bag and heating the skin material in a state where the inside of the bag is evacuated and the outside of the bag is under the atmospheric pressure after the first vacuum heating step.

In the configuration, since there is included the first vacuum heating step of generating and removing the first volatile component from the skin material by placing the skin material in the bag and heating the skin material in a state where the inside of the bag is evacuated and the outside of the bag is under the atmospheric pressure for a predetermined time in the region of a low temperature in a case where the thermosetting resin contains the first volatile component generated in the region of a temperature lower than the curing temperature at which the thermosetting resin is cured, and only one time of the sealing pressurizing heating step of performing pressurizing and heating with the use of the sealing pressurizing heating facility is included in manufacturing one structure, the core material and the skin material can be suitably bonded to each other without significantly decreasing a manufacturing efficiency regardless of the fact that whether or not the hole is formed in the surface of the core material, and the high-quality structure that can reduce a possibility of generation of pores (voids) in the skin material when bonded to the core material can be manufactured.

According to still another aspect of the invention, in order to solve the problem described above and to achieve the object, there is provided a method for setting a heating condition for a skin material of setting a heating condition in a method for preparing the skin material in manufacturing a structure including a core material and the skin material stacked on a surface of the core material. The method includes a thermal gravimetric analysis step of performing thermal gravimetric analysis on a thermosetting resin included in the skin material, a first determination step of determining whether or not the thermosetting resin contains a first volatile component generated in a region of a temperature lower than a curing temperature at which the thermosetting resin is cured based on a result of the thermal gravimetric analysis, a second determination step of determining whether or not the thermosetting resin contains a second volatile component generated in a region of a high temperature including the curing temperature based on the result of the thermal gravimetric analysis, a first vacuum heating step setting step of setting a first vacuum heating step of generating and removing the first volatile component from the skin material by placing the skin material in a bag and heating the skin material in a state where an inside of the bag is evacuated and an outside of the bag is under an atmospheric pressure for a predetermined time in the region of a low temperature in a case where it is determined that the thermosetting resin contains the first volatile component generated in the region of a temperature lower than the curing temperature at which is the thermosetting resin is cured in the first determination step, and a second vacuum heating step setting step of setting a second vacuum heating step of half-curing the thermosetting resin from which the first volatile component is removed by placing the skin material in the bag and heating the skin material in a state where the inside of the bag is evacuated and the outside of the bag is under the atmospheric pressure at a temperature that is equal to or lower than the curing temperature in a case where it is determined that the thermosetting resin contains the second volatile component generated in the region of a high temperature including the curing temperature in the second determination step, and setting the second vacuum heating step of half-curing the thermosetting resin from which the first volatile component is removed by placing the skin material in the bag and heating the skin material in a state where the inside of the bag is evacuated and the outside of the bag is under the atmospheric pressure in a case where it is determined that the thermosetting resin does not contain the second volatile component generated in the region of a high temperature including the curing temperature.

In the configuration, since the heating conditions of the first vacuum heating step and the second vacuum heating step are optimized based on the two determination results obtained by performing thermal gravimetric analysis on the thermosetting resin, the high-quality structure that can further reduce a possibility of generation of pores (voids) in the skin material when bonded to the core material regardless of the fact that the hole is formed in the surface of the core material can be manufactured.

Advantageous Effects of Invention

The present invention can provide the method for manufacturing a structure, the method for preparing a skin material, and the method for setting a heating condition for a skin material, which allow manufacturing of the high-quality structure by suitably bonding the core material and the skin material to each other without significantly decreasing a manufacturing efficiency.

DESCRIPTION OF EMBODIMENTS

Hereinafter, embodiments of the present invention will be described in detail based on the drawings. It is evident that the embodiments do not limit the invention. In addition, configuration elements in the embodiments include elements that allow those skilled in the art to perform easy replacement or substantially the same elements. It is possible to combine configuration elements described in the following as appropriate.

First Embodiment

Figure 1:
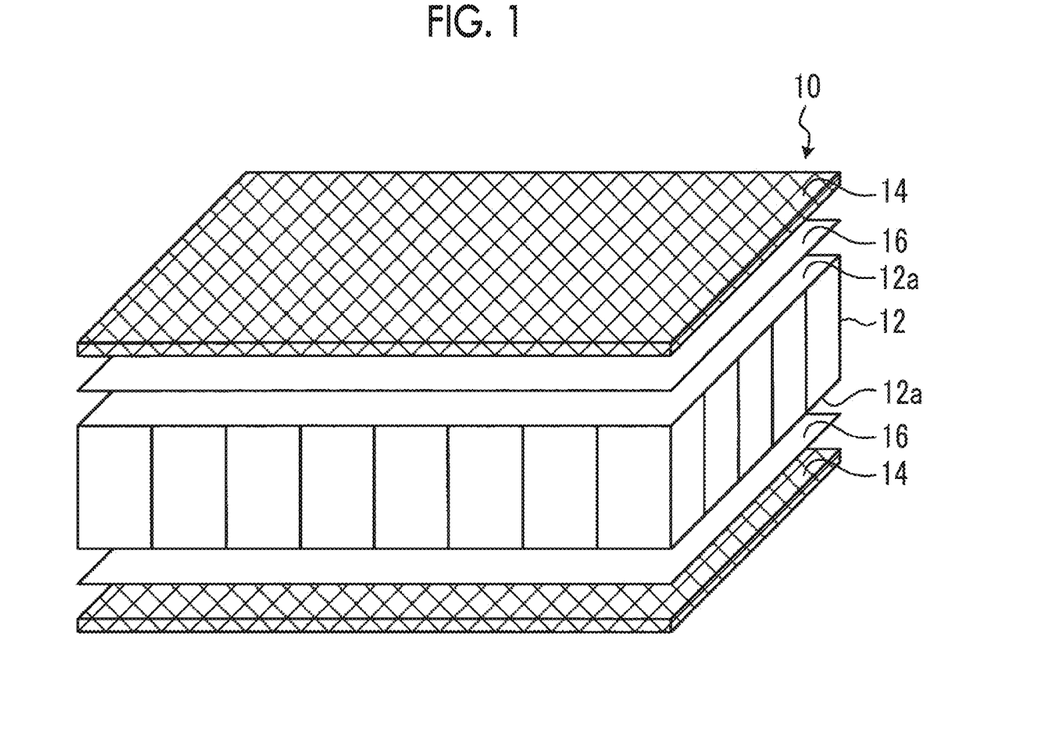
FIG. 1 is a schematic configuration view of a structure manufactured through a method for manufacturing a structure according to a first embodiment of the present invention.

FIG. 1 is a schematic configuration view of a structure manufactured through a method for manufacturing a structure according to a first embodiment of the present invention. As illustrated in FIG. 1, the structure 10 includes a core material 12, skin materials 14, and adhesive layers 16. The skin materials 14 are stacked and bonded to surfaces 12a on both sides of the core material 12 via the film-like adhesive layers 16. In FIG. 1, in order to describe the structure 10, the core material 12, the skin materials 14, and the adhesive layers 16 are separated and illustrated.

The core material 12 is a honeycomb structural material in which holes formed to penetrate in a thickness direction are arranged in a plane direction. A form, in which holes are formed in a hexagonal column shape through penetration in the thickness direction and are arranged in the plane direction without a gap with a plate material that is formed to extend in the thickness direction interposed therebetween, is given as an example of the honeycomb structural material used in the core material 12 in the first embodiment. Without being limited thereto, a form, in which holes are formed in a triangular or quadrangular column shape through penetration in the thickness direction and are arranged in the plane direction without a gap with a plate material that is formed to extend in the thickness direction interposed therebetween, may be adopted as the honeycomb structural material used in the core material 12. In addition, a form, in which convex holes that are easily adapted to a curved shape exemplified by a flexible core are formed, may be adopted as the honeycomb structural material used in the core material 12. In addition, a form in which holes penetrating the core material are arranged regularly or irregularly or a form in which holes that do not penetrate the core material are arranged regularly or irregularly may be adopted as the honeycomb structural material used in the core material 12. The core material is formed of a material that can withstand a high-pressure and high-temperature environment in a sealing pressurizing heating step S6 (refer to FIG. 2) to be described later to an extent that the core material can sufficiently preserve a shape thereof without the occurrence of remarkable physical deformation or chemical reactions.

The skin materials 14 each include a thermosetting resin. A plate-shaped composite material that includes a reinforced fiber into which a thermosetting resin is infiltrated can be given as an example of the skin materials 14. The composite material used in the skin materials 14 is light and has high strength. Although a carbon fiber can be given as an example of the reinforced fiber included in the composite material used in the skin materials 14 in the first embodiment, without being limited thereto, other metal fibers may be used. In addition, the skin materials 14 may not include the reinforced fiber. In the first embodiment, a resin having an epoxy-based resin can be given as an example of the thermosetting resin included in the composite material used in the skin materials 14. A case where the thermosetting resin included in the composite material used in the skin materials 14 has the epoxy-based resin is preferable since the composite material becomes lighter and has higher strength.

It is preferable that the surfaces 12a of the core material 12 and surfaces of the skin materials 14 are in a form of matching each other without a gap except for a region of each of the surfaces 12a of the core material 12 in which the holes are formed. Although an example in which the surfaces 12a of the core material 12 and the surfaces of the skin materials 14 are planar surfaces is given in the first embodiment, without being limited thereto, the surfaces may be gentle curved surfaces and bent surfaces having a bent part.

It is preferable that the surfaces 12a of the core material 12 and the surfaces of the skin materials 14 have almost the same shape in a surface direction. In this case, the skin materials 14 can completely cover and protect the surfaces 12a of the core material 12, and can close the holes provided in the surfaces 12a of the core material 12. In a case where the surfaces of the skin materials 14 each have a shape in the surface direction which is larger than the surfaces 12a of the core material 12 in all directions, the skin materials 14 can completely cover and protect the surfaces 12a of the core material 12, and can close the holes provided in the surfaces 12a of the core material 12. In addition, in a case where the surfaces of the skin materials 14 each have a shape in the surface direction which is smaller than the surfaces 12a of the core material 12 in all directions, the skin materials 14 can cover and protect a part of the surfaces 12a of the core material 12, close the holes provided in the surfaces 12a of the core material 12, and expose other parts of each of the surfaces 12a of the core material 12.

The adhesive layers 16 each have a film-like shape, and each are provided between the surface 12a of the core material 12 and the surface of the skin material 14. An adhesive configuring each of the adhesive layers 16 is selected as appropriate according to a material used in the core material 12, a reinforced fiber and a thermosetting resin which are used in the skin materials 14, and an environment such as a pressure and a temperature applied in the sealing pressurizing heating step S6 (refer to FIG. 2). The adhesive layers 16 are provided in the first embodiment. However, in a case where the core material 12 and the skin materials 14 are bonded to each other by the material used in the core material 12 and the material used in the skin materials 14, for example, in a case where the core material 12 and the skin materials 14 are bonded to each other by curing the thermosetting resin included in the skin materials 14, the adhesive layers may not be provided.

Figure 2:
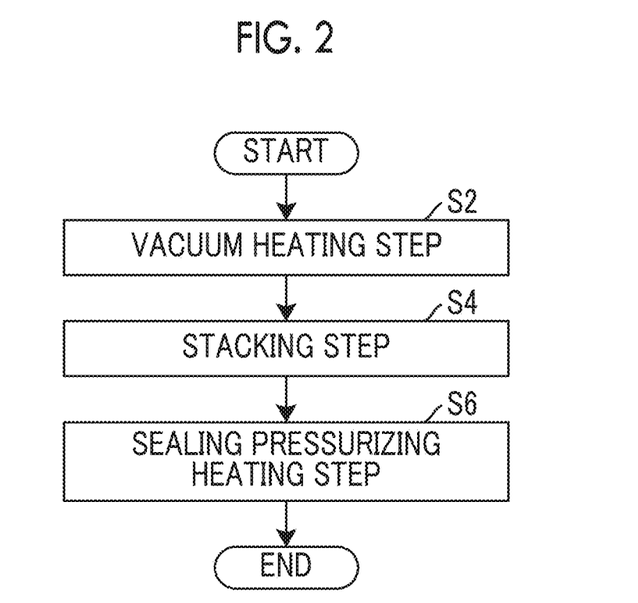
FIG. 2 is a flowchart showing the method for manufacturing a structure according to the first embodiment of the present invention.

FIG. 2 is a flowchart showing the method for manufacturing a structure according to the first embodiment of the present invention. The method for manufacturing the structure 10 having the configuration described above will be described in the following with reference to FIG. 2. As shown in FIG. 2, the method for manufacturing a structure according to the first embodiment of the present invention has a vacuum heating step S2, a stacking step S4, and the sealing pressurizing heating step S6.

Figure 3:
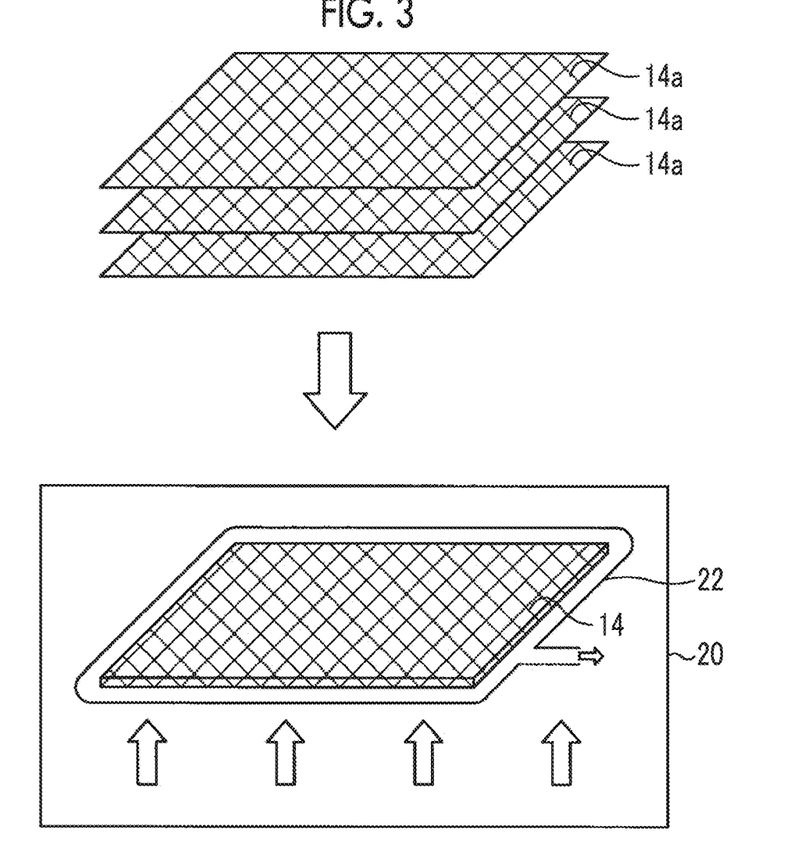
FIG. 3 is an explanatory view for describing a vacuum heating step of FIG. 2.

FIG. 3 is an explanatory view for describing the vacuum heating step S2 of FIG. 2. In the vacuum heating step S2, first, the plate materials 14a which configure the skin material 14 and are made of a composite material are stacked as illustrated in FIG. 3. Herein, although three layers of the plate materials 14a made of a composite material are stacked in FIG. 3, without being limited thereto, there may be only one layer, two layers, or four or more layers. In the vacuum heating step S2, next, the stacked plate materials 14a are placed in a bag 22 such as a bag film, the inside of the bag 22 is evacuated to put the bag into a vacuum heating facility 20, and the outside of the bag 22 is heated by the vacuum heating facility 20 under the atmospheric pressure. Accordingly, the vacuum heating step S2 is a step of integrating the skin materials 14 as the thermosetting resin included in the plate materials 14a is half-cured while pressurizing the plate materials 14a in all directions including a stacking direction with the use of a pressure difference between the atmospheric pressure outside the bag 22 and the vacuum of the bag 22, that is, as the gelation of the thermosetting resin proceeds. In the vacuum heating step S2, the skin materials 14 are brought into a state where the thermosetting resin is half-cured, that is, a pre-cured state, before being put into a sealing pressurizing heating facility 30 (refer to FIG. 4) in the sealing pressurizing heating step S6 to be described later.

The stacking step S4 is a step of stacking the skin materials 14 in which the thermosetting resin is half-cured in the vacuum heating step S2 onto the surfaces 12a of the core material 12. It is preferable that the skin materials 14 in which the thermosetting resin is half-cured in the vacuum heating step S2 are stacked onto the surfaces 12a of the core material 12 via the film-like adhesive layers 16 in the stacking step S4. Specifically, in the stacking step S4 in the first embodiment, the skin material 14, the adhesive layer 16, the core material 12, the adhesive layer 16, and the skin material 14 are stacked in this order from one side to the other side as illustrated in FIG. 1.

Figure 4:
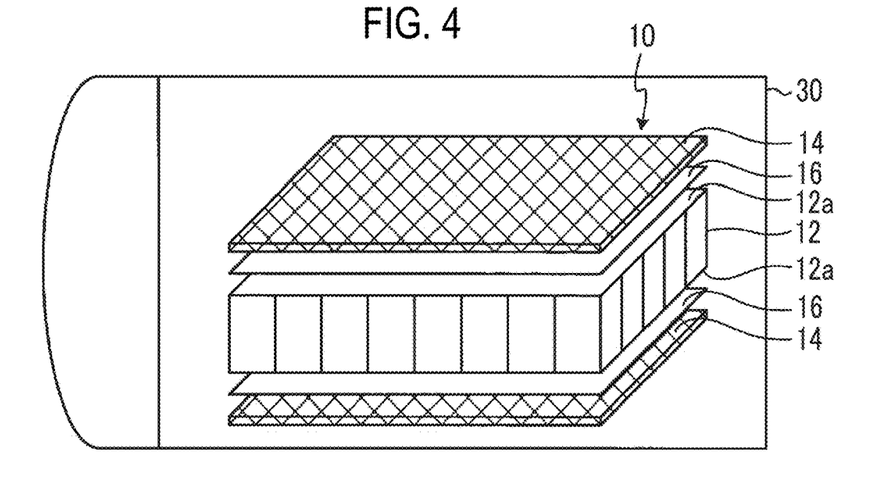
FIG. 4 is an explanatory view for describing a sealing pressurizing heating step of FIG. 2.

FIG. 4 is an explanatory view for describing the sealing pressurizing heating step S6 of FIG. 2. In the sealing pressurizing heating step S6, first, the core material 12 and the skin materials 14 which are stacked in the stacking step S4 are covered with a material such as a bag film and the inside of the material such as a bag film is brought into an evacuated state. After then, the core material and the skin materials are put into the sealing pressurizing heating facility 30. The sealing pressurizing heating step S6 is a step of bonding and integrating the core material 12 and the skin materials 14 with each other by sealing the inside of the sealing pressurizing heating facility 30 next and pressurizing the core material 12 and the skin materials 14 which are put therein in all directions including the stacking direction while increasing a temperature inside the sealing pressurizing heating facility to a thermosetting resin curing temperature and maintaining the temperature for a certain amount of time. In a case where the adhesive layers 16 are stacked between the core material 12 and the skin materials 14 in the stacking step S4, the adhesive layers 16 bond and integrate the core material 12 with the skin materials 14 in the sealing pressurizing heating step S6. In addition, in a case where the adhesive layers 16 are not stacked between the core material 12 and the skin materials 14 in the stacking step S4, the core material 12 and the skin materials 14 are bonded and integrated with each other in the sealing pressurizing heating step S6 by the material used in the core material 12 and the material used in the skin materials 14, for example, by curing the thermosetting resin included in the skin materials 14. With this, the structure 10 is obtained.

In the sealing pressurizing heating step S6 in the first embodiment, the inside of the sealing pressurizing heating facility 30 is heated and pressurized by using an autoclave facility as the sealing pressurizing heating facility 30 and increasing the pressure thereof with a gas.

Since the method for manufacturing a structure according to the first embodiment of the present invention has the configuration described above, the thermosetting resin can be half-cured by placing the skin materials 14 in the bag 22 and heating the skin material in a state where the inside of the bag 22 is evacuated and the outside of the bag 22 is under the atmospheric pressure in the vacuum heating step S2 before the sealing pressurizing heating step S6. For this reason, the method for manufacturing a structure according to the first embodiment of the present invention can reduce deformation of the skin materials 14 at a high pressure and a high temperature in the sealing pressurizing heating step S6 even in a case where the core material 12 is a honeycomb structural material in which the holes formed to penetrate in the thickness direction are arranged in the plane direction. Accordingly, the method for manufacturing a structure according to the first embodiment of the present invention allows reduction of a possibility of the occurrence of sinking (dimple) in the skin materials 14 toward the holes in the core material 12 and allows manufacturing of the high-quality structure 10 that includes the light and highly rigid honeycomb structural material. In addition, the method for manufacturing a structure according to the first embodiment of the present invention allows the core material 12 and the skin materials 14 to be suitably bonded to each other without significantly decreasing a manufacturing efficiency since the sealing pressurizing heating step S6 of performing pressurizing and heating with the use of the sealing pressurizing heating facility 30 is included just one time in manufacturing one structure 10.

In the method for manufacturing a structure according to the first embodiment of the present invention, the skin materials 14 in which the thermosetting resin is half-cured are stacked on sides of the surfaces 12a of the core material 12 via the film-like adhesive layers 16 in the stacking step S4, and the adhesive layers 16 bond and integrate the core material 12 with the skin materials 14 in the sealing pressurizing heating step S6. For this reason, since the core material 12 and the skin materials 14 are bonded to each other via the film-like adhesive layers 16 in the method for manufacturing a structure according to the first embodiment of the present invention, various structures in which variations of the core material 12 and the skin materials 14 are widened can be obtained.

Although the skin materials 14 are stacked on the sides of the surfaces 12a, which are both sides of the core material 12, in the method for manufacturing a structure according to the first embodiment of the present invention, without being limited thereto, the skin materials 14 may be stacked on any one side of the sides of the surfaces 12a of the core material 12. In addition, although processing of the vacuum heating step S2 is executed on the skin materials 14 stacked on the sides of the surfaces 12a, which are both sides of the core material 12, in the method for manufacturing a structure according to the first embodiment of the present invention, without being limited thereto, the processing of the vacuum heating step S2 may be executed only on the skin material 14 that is on one side of which a possibility of the occurrence of sinking (dimple) is intended to be reduced, for example, only on the skin material 14 that is on a side which is an aerodynamic surface in a case where the structure 10 is used in an aircraft, an automobile, and a ship.

Second Embodiment

Figure 5:
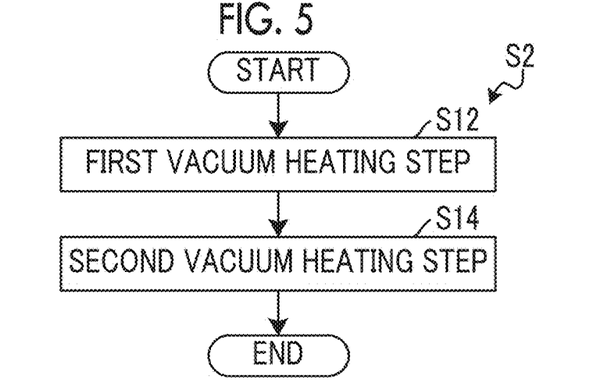
FIG. 5 is a flowchart showing a vacuum heating step according to a second embodiment of the present invention.

FIG. 5 is a flowchart showing the vacuum heating step S2 according to a second embodiment of the present invention. As shown in FIG. 5, a method for manufacturing a structure according to the second embodiment of the present invention is a method in which the vacuum heating step S2 is changed to a step having a first vacuum heating step S12 and a second vacuum heating step S14. The method for manufacturing a structure according to the second embodiment of the present invention is different from the method for manufacturing a structure according to the first embodiment of the present invention, the core material 12 to be used is not limited to the honeycomb structural material in which the holes formed to penetrate in the thickness direction are arranged in the plane direction, and the holes may not be formed therein. The method for manufacturing a structure according to the second embodiment is the same as the method for manufacturing a structure according to the first embodiment in terms of other configurations. The method for manufacturing a structure according to the second embodiment will be described in the following. As for other configurations which are the same as the first embodiment, the method for manufacturing a structure according to the second embodiment uses the same reference sign groups as the first embodiment, and detailed description thereof will be omitted.

Figure 6:
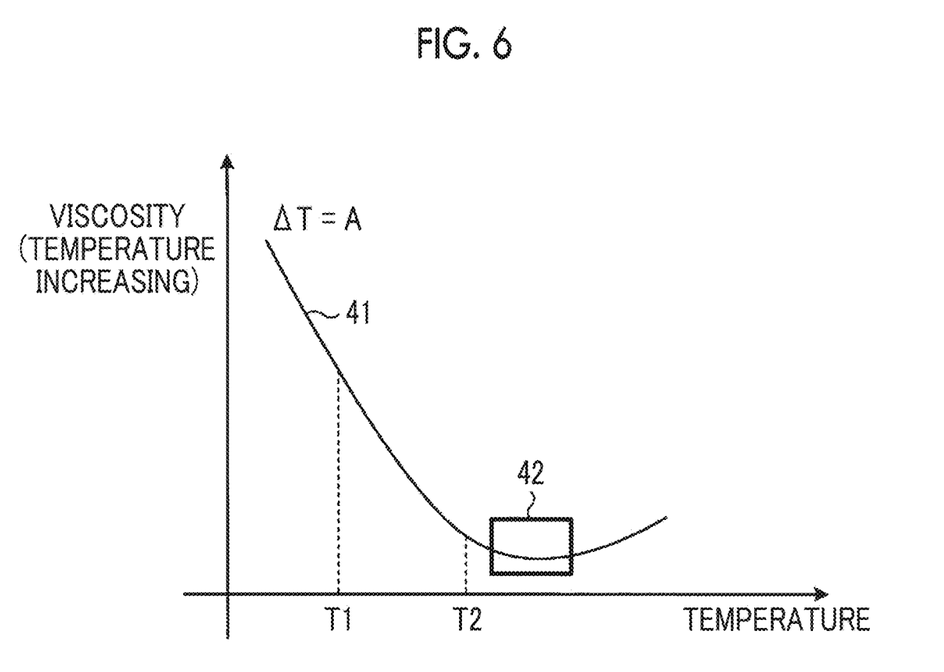
FIG. 6 is a graph showing a viscosity characteristic of a thermosetting resin included in a skin material of FIG. 1.

FIG. 6 is a graph showing an example of a viscosity characteristic of the thermosetting resin included in the skin materials 14 of FIG. 1. When the temperature dependency of viscosity of the thermosetting resin included in the skin materials 14 is measured with a temperature increasing speed ΔT as a constant value A, for example, a viscosity characteristic shown with a curve 41 of FIG. 6 is obtained. As shown with the curve 41 of FIG. 6, the thermosetting resin included in the skin materials 14 has an extremely low viscosity region 42 where viscosity is extremely low, in a curing temperature region that is a region of a temperature at which the thermosetting resin is cured. As shown with the curve 41 of FIG. 6, the viscosity of the thermosetting resin included in the skin materials 14 monotonously decreases, just as a general liquid, to a temperature at which the extremely low viscosity region 42 is reached. When the temperature at which the extremely low viscosity region 42 is reached is exceeded, the viscosity is switched to a state of monotonously increasing as the gelation of the thermosetting resin proceeds or the thermosetting resin is cured. The temperature at which the extremely low viscosity region 42 is reached changes according to the temperature increasing speed ΔT.

As shown in FIG. 6, a temperature T1 is a temperature lower than the temperature at which the extremely low viscosity region 42 is reached, and is a temperature at which the thermosetting resin is not cured. As shown in FIG. 6, a temperature T2 is a temperature that is lower than the temperature at which the extremely low viscosity region 42 is reached and is higher than the temperature T1, and is a temperature that is equal to or lower than the curing temperature. Herein, the curing temperature is one temperature out of temperatures included in the curing temperature region where the thermosetting resin is cured. In addition, the temperature T2 is a temperature at which the gelation of the thermosetting resin proceeds. The temperature T1 is less than 100° C., and is preferably 70° C. or more and 80° C. or less. The temperature T2 is 100° C. or more, and is preferably 130° C. or more and 150° C. or less.

Figure 7:
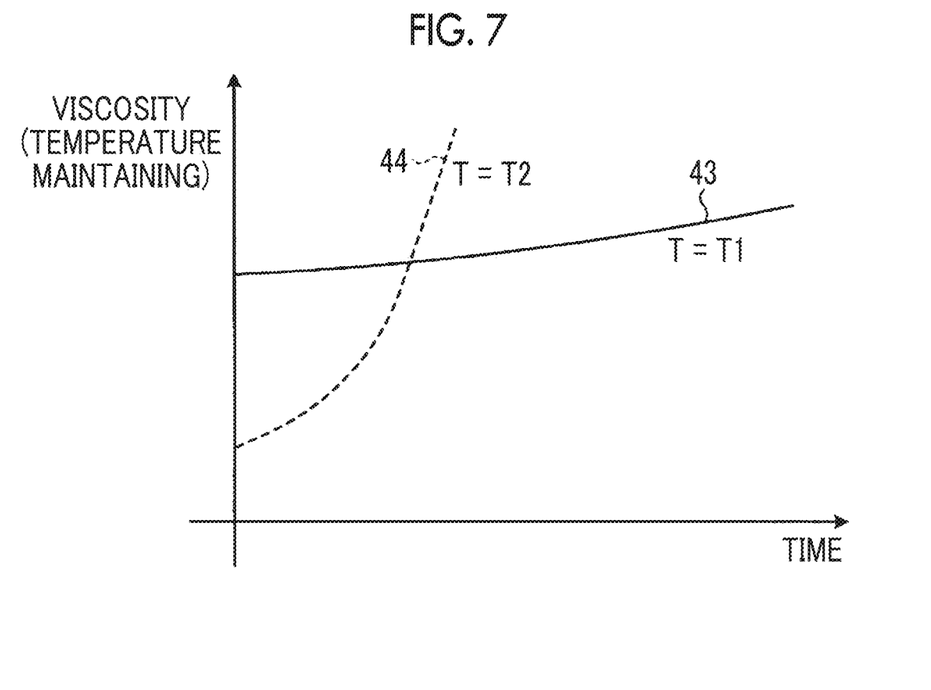
FIG. 7 is a graph showing a viscosity characteristic of the thermosetting resin included in the skin material of FIG. 1.

FIG. 7 is a graph showing an example of a viscosity characteristic of the thermosetting resin included in the skin materials 14 of FIG. 1. When the dependency of the viscosity of the thermosetting resin included in the skin materials 14 on time for which the temperature T1 is maintained is measured under an environment where the temperature T1 is maintained, for example, a viscosity characteristic shown in a curve 43 of FIG. 7 is obtained. As shown with the curve 43 of FIG. 7, the thermosetting resin included in the skin materials 14 maintains viscosity at the temperature T1 in general by being placed under the environment of the temperature T1 at which the thermosetting resin is not cured. As will be described later, under the environment where the temperature T1 is maintained, the viscosity of the thermosetting resin included in the skin materials 14 monotonously increases very slowly as a first volatile component is generated.

When the dependency of the viscosity of the thermosetting resin included in the skin materials 14 on time for which the temperature T2 is maintained is measured under an environment where the temperature T2 is maintained, for example, a viscosity characteristic shown in a curve 44 of FIG. 7 is obtained. As shown with the curve 44 of FIG. 7, the viscosity of the thermosetting resin included in the skin materials 14 rapidly and monotonously increases as the gelation of the thermosetting resin proceeds by being placed under the environment of the temperature T2 at which the gelation of the thermosetting resin proceeds.

Figure 8:
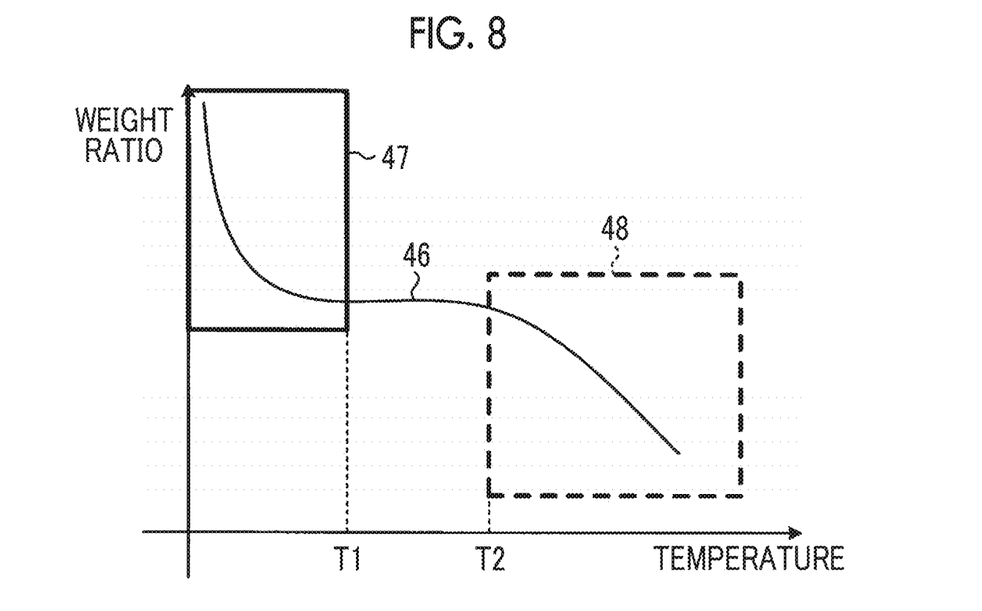
FIG. 8 is a graph showing a thermogravimetric characteristic of the thermosetting resin included in the skin material of FIG. 1.

FIG. 8 is a graph showing an example of a thermogravimetric characteristic of the thermosetting resin included in the skin materials 14 of FIG. 1. When thermal gravimetric analysis (TGA), in which the temperature dependency of a weight ratio with the temperature increasing speed ΔT being constant is measured, is performed on the thermosetting resin included in the skin materials 14, for example, a thermogravimetric characteristic shown in a curve 46 of FIG. 8 is obtained. As shown with the curve 46 of FIG. 8, the thermosetting resin included in the skin materials 14 has a first region 47 where a weight ratio rapidly decreases at the temperature T1 or less, a region where the weight ratio is almost constant at the temperature T1 or more and the temperature T2 or less, and a second region 48 where the weight ratio rapidly decreases at the temperature T2 or more.

It can be seen from the thermogravimetric characteristic shown with the curve 46 of FIG. 8 that the thermosetting resin included in the skin materials 14 contains the first volatile component generated in the first region 47, which is a region of a temperature lower than the curing temperature. In addition, it can be seen from the thermogravimetric characteristic shown with the curve 46 of FIG. 8 that the thermosetting resin included in the skin materials 14 contains a second volatile component generated in the second region 48, which is a region having a high temperature including the curing temperature. In addition, it can be seen from the thermogravimetric characteristic shown with the curve 46 of FIG. 8 that the thermosetting resin included in the skin materials 14 does not contain a volatile component generated between the first region 47 and the second region 48.

Figure 9:
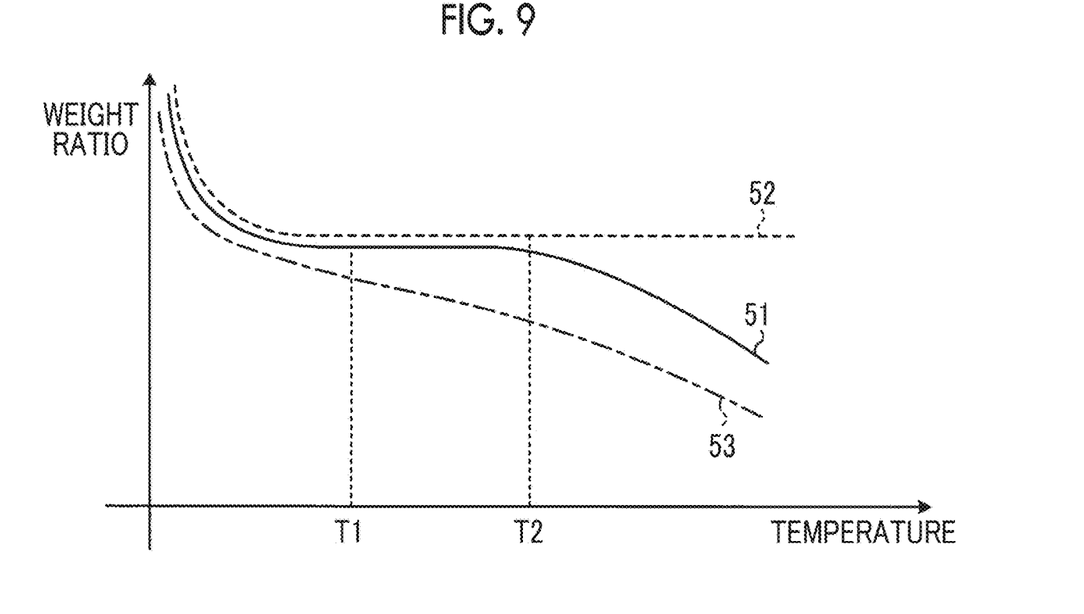
FIG. 9 is a graph showing examples of thermogravimetric characteristics of a variety of thermosetting resins that can be used in the skin material of FIG. 1.

FIG. 9 is a graph showing examples of thermogravimetric characteristics of a variety of thermosetting resins that can be used in the skin materials 14 of FIG. 1. As shown in FIG.

9, a variety of thermosetting resins that can be used in the skin materials 14 obtain thermogravimetric characteristics having mainly three types of tendencies including a thermogravimetric characteristic shown with a curve 51, a thermogravimetric characteristic shown with a curve 52, and a thermogravimetric characteristic shown with a curve 53. Since the thermogravimetric characteristic shown with the curve 51 is the same as the thermogravimetric characteristic shown with the curve 46 of FIG. 8, detailed description thereof will be omitted.

The thermogravimetric characteristic shown with the curve 52 is attributable to the thermosetting resin of which the weight ratio does not rapidly decrease in the second region that is the region of a high temperature including the curing temperature, compared to the thermogravimetric characteristic shown with the curve 51, that is, which does not contain the second volatile component generated in the second region. The thermogravimetric characteristic shown with the curve 53 is attributable to the thermosetting resin of which the weight ratio decreases even between the first region that is the region of a temperature lower than the curing temperature, and the second region that is the region of a high temperature including the curing temperature compared to the thermogravimetric characteristic shown with the curve 51, that is, which further contains a volatile component generated between the first region and the second region.

The vacuum heating step S2 in the method for manufacturing a structure according to the second embodiment of the present invention has the first vacuum heating step S12 and the second vacuum heating step S14 as shown in FIG. 5. The vacuum heating step S2 in the method for manufacturing a structure according to the second embodiment of the present invention is a method for preparing a skin material of preparing the skin materials 14 in manufacturing the structure 10 including the core material 12 and the skin materials 14.

The first vacuum heating step S12 is a step performed in a case where the thermosetting resin included in the skin materials 14 contains the first volatile component generated in the region of a temperature lower than the curing temperature at which the thermosetting resin is cured. The first vacuum heating step S12 is a step performed, for example, in a case where the thermosetting resin has the thermogravimetric characteristic shown with the curve 46 of FIG. 8 and in a case where the thermosetting resin has the thermogravimetric characteristics shown with the curve 51, the curve 52, and the curve 53 of FIG. 9. In these cases, the first vacuum heating step S12 is a step of decreasing the viscosity of the thermosetting resin and generating and removing the first volatile component from the skin materials 14 by placing the skin materials 14 in the bag 22 and heating the skin material in a state where the inside of the bag 22 is evacuated and the outside of the bag 22 is under the atmospheric pressure for a predetermined time at the temperature T1 included in the region of a low temperature in which the first volatile component is generated.

The second vacuum heating step S14 is a step of half-curing the thermosetting resin from which the first volatile component is removed by placing the skin materials 14 in the bag 22 and heating the skin material in a state where the inside of the bag 22 is evacuated and the outside of the bag 22 is under the atmospheric pressure after the first vacuum heating step S12.

It is preferable that the viscosity of thermosetting resin is increased and the second volatile component is not generated to an extent possible in the second vacuum heating step S14 by placing the skin materials 14 in the bag 22 and heating the skin material in a state where the inside of the bag 22 is evacuated and the outside of the bag 22 is under the atmospheric pressure at the curing temperature or lower in a case where the thermosetting resin included in the skin materials 14 further contains the second volatile component generated in the region of a high temperature including the curing temperature at which the thermosetting resin is cured. For example, it is preferable to perform heating at the temperature T2, which is a temperature that is equal to or lower than the curing temperature, in the second vacuum heating step S14 in a case where the thermosetting resin has the thermogravimetric characteristic shown with the curve 46 of FIG. 8 and in a case where the thermosetting resin has the thermogravimetric characteristics shown with the curve 51 and the curve 53 of FIG. 9.

It is preferable that the skin materials 14 are placed in the bag 22 and the skin materials are heated, in a state where the inside of the bag 22 is evacuated and the outside of the bag 22 is under the atmospheric pressure, to a temperature at which the amount of a generated volatile component including the second volatile component is suppressed to be the minimum in the second vacuum heating step S14 in a case where the thermosetting resin included in the skin materials 14 further contains a volatile component generated even between the first region, which is a region of a temperature lower than the curing temperature, and the second region, which is a region of a high temperature including the curing temperature, for example, a case where the thermosetting resin has the thermogravimetric characteristic shown with the curve 53 of FIG. 9.

Since the volatile component including the second volatile component is not generated in a case where the thermosetting resin included in the skin materials 14 does not contain the second volatile component generated in the region of a high temperature including the curing temperature at which the thermosetting resin is cured, for example, a case where the thermosetting resin has the thermogravimetric characteristic shown with the curve 52 of FIG. 9, it is preferable that the skin materials 14 are placed in the bag 22 and the skin materials are heated in a state where the inside of the bag 22 is evacuated and the outside of the bag 22 is under the atmospheric pressure in the region of a high temperature suitable for curing the thermosetting resin in the second vacuum heating step S14.

Figure 10:
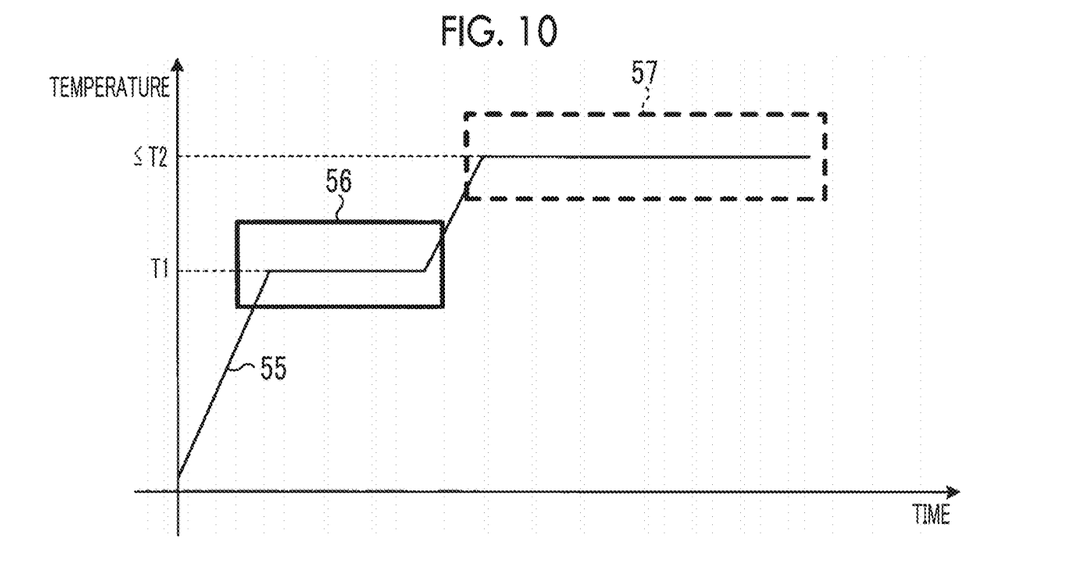
FIG. 10 is an explanatory graph for describing a temperature profile of the vacuum heating step of FIG. 5.

FIG. 10 is an explanatory graph for describing a temperature profile 55 of the vacuum heating step S2 of FIG. 5. As shown in FIG. 10, the temperature profile 55 related to the vacuum heating step S2 has a first vacuum heating region 56 where the temperature T1 is maintained for a predetermined time after increasing to the temperature T1, and subsequently to the first vacuum heating region 56, a second vacuum heating region 57 where a predetermined temperature, which is equal to or lower than the temperature T2, is maintained for a predetermined time after increasing to the predetermined temperature, which is equal to or lower than the temperature T2. The first vacuum heating region 56 shown in FIG. 10 is a region where heating processing in the first vacuum heating step S12 is performed. The second vacuum heating region 57 shown in FIG. 10 is a region where heating processing in the second vacuum heating step S14 is performed. The temperature profile 55 is used in a case of consecutively performing the first vacuum heating step S12 and the second vacuum heating step S14.

Figure 11:
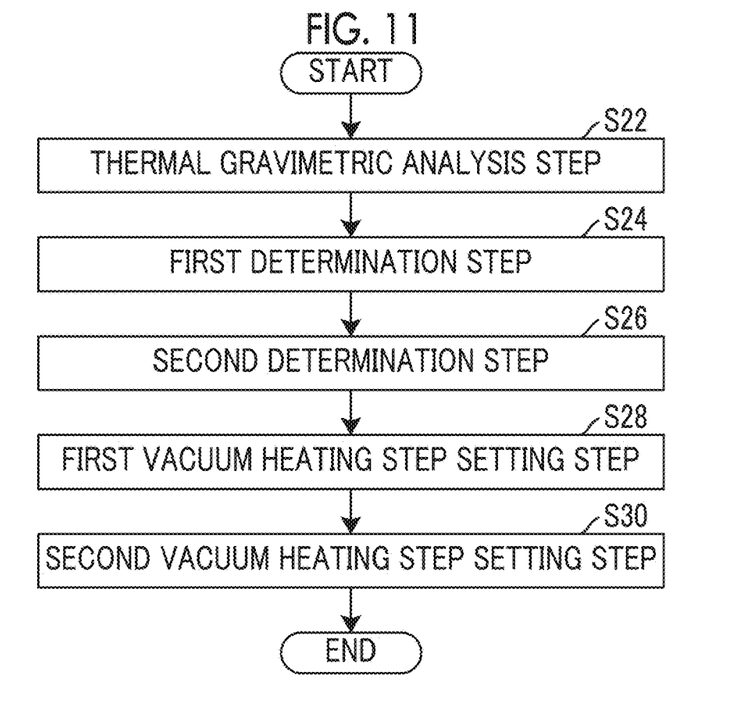
FIG. 11 is a flowchart showing a method for setting a heating condition for a skin material in the vacuum heating step according to the second embodiment of the present invention.

FIG. 11 is a flowchart showing a method for setting a heating condition for a skin material according to the second embodiment of the present invention. Heating conditions of the first vacuum heating step S12 and the second vacuum heating step S14 in the vacuum heating step S2 of the method for manufacturing a structure according to the second embodiment of the present invention are set based on the method for setting a heating condition for a skin material shown in FIG. 11. That is, the method for setting a heating condition for a skin material shown in FIG. 11 is a method for setting heating conditions in the method for preparing a skin material of preparing the skin materials in manufacturing the structure 10 including the core material 12 and the skin materials 14. The method for setting a heating condition for a skin material according to the second embodiment of the present invention has a thermal gravimetric analysis step S22, a first determination step S24, a second determination step S26, a first vacuum heating step setting step S28, and a second vacuum heating step setting step S30, as shown in FIG. 11.

The thermal gravimetric analysis step S22 is a step of performing thermal gravimetric analysis on the thermosetting resin included in the skin materials 14. In the thermal gravimetric analysis step S22, for example, the thermogravimetric characteristic shown with the curve 46 of FIG. 8 and the thermogravimetric characteristics shown with the curve 51, the curve 52, and the curve 53 of FIG. 9 are obtained according to a thermosetting resin.

The first determination step S24 is a step of determining whether or not the thermosetting resin contains the first volatile component generated in the region of a temperature lower than the curing temperature at which the thermosetting resin is cured based on results of the thermal gravimetric analysis obtained in the thermal gravimetric analysis step S22. For example, in a case where the results of the thermal gravimetric analysis obtained in the thermal gravimetric analysis step S22 imply that the thermosetting resin has the thermogravimetric characteristic shown with the curve 46 of FIG. 8, and in a case where the results imply that the thermosetting resin has the thermogravimetric characteristics shown with the curve 51, the curve 52, and the curve 53 of FIG. 9, it is determined that the thermosetting resin contains the first volatile component generated in a region of a low temperature that is equal to or lower than the temperature T1 in the first determination step S24.

The second determination step S26 is a step of determining whether or not the thermosetting resin contains the second volatile component generated in the region of a high temperature including the curing temperature based on the results of the thermal gravimetric analysis obtained in the thermal gravimetric analysis step S22. For example, in a case where the results of the thermal gravimetric analysis obtained in the thermal gravimetric analysis step S22 imply that the thermosetting resin has the thermogravimetric characteristic shown with the curve 46 of FIG. 8, and in a case where the results imply that the thermosetting resin has the thermogravimetric characteristics shown with the curve 51 and the curve 53 of FIG. 9, it is determined that the thermosetting resin contains the second volatile component generated in a region of a high temperature that is equal to or higher than the temperature T2 in the second determination step S26.

The first vacuum heating step setting step S28 is performed after the first determination step S24, and is a step of setting the first vacuum heating step S12 of the vacuum heating step S2 in a case where it is determined that the thermosetting resin contains the first volatile component generated in the region of a temperature lower than the curing temperature at which the thermosetting resin is cured in the first determination step S24. For example, in a case where the thermosetting resin has the thermogravimetric characteristic shown with the curve 46 of FIG. 8 and in a case where the thermosetting resin has the thermogravimetric characteristics shown with the curve 51, the curve 52, and the curve 53 of FIG. 9, the first vacuum heating region 56 of FIG. 10 is set in the temperature profile 55 in the first vacuum heating step setting step S28.

The first vacuum heating step S12 of the vacuum heating step S2 is not set in the first vacuum heating step setting step S28 in a case where it is determined that the thermosetting resin does not contain the first volatile component generated in the region of a temperature lower than the curing temperature at which the thermosetting resin is cured in the first determination step S24. For this reason, after increasing to a heating temperature in the second vacuum heating step S14, the temperature profile maintained at the heating temperature for a predetermined time is set in the vacuum heating step S2 in a case where the second vacuum heating step S14 is set in the second vacuum heating step setting step S30 without setting the first vacuum heating step S12 in the first vacuum heating step setting step S28.

The second vacuum heating step setting step S30 is performed after the second determination step S26, and is a step of setting the second vacuum heating step S14 according to the determination results in the second determination step S26. In a case where it is determined that the thermosetting resin contains the second volatile component generated in the region of a high temperature including the curing temperature in the second determination step S26, the second vacuum heating step S14 of the vacuum heating step S2, in which the skin materials 14 are placed in the bag 22 and the skin materials are heated in a state where the inside of the bag 22 is evacuated and the outside of the bag 22 is under the atmospheric pressure at the curing temperature or lower, is set in the second vacuum heating step setting step S30. For example, in a case where the thermosetting resin has the thermogravimetric characteristic shown with the curve 46 of FIG. 8 and in a case where the thermosetting resin has the thermogravimetric characteristics shown with the curve 51 and the curve 53 of FIG. 9, the second vacuum heating region 57 of FIG. 10 is set in the temperature profile 55 in the second vacuum heating step setting step S30.

In a case where it is determined that the thermosetting resin does not contain the second volatile component generated in the region of a high temperature including the curing temperature in the second determination step S26, the second vacuum heating step S14 of the vacuum heating step S2, in which the skin materials 14 are placed in the bag 22 and the skin materials are heated in a state where the inside of the bag 22 is evacuated and the outside of the bag 22 is under the atmospheric pressure in a region of a high temperature suitable for curing the thermosetting resin, is set in the second vacuum heating step setting step S30. For example, in a case where the thermosetting resin has the thermogravimetric characteristic shown with the curve 52 of FIG. 9 in the second vacuum heating step setting step S30, the temperature profile maintained for a predetermined time is set in the region of a high temperature suitable for curing the thermosetting resin in the vacuum heating step S2.

Since the method for manufacturing a structure, the method for preparing a skin material, and the method for setting a heating condition for a skin material according to the second embodiment of the present invention have the configurations described above, there is included the first vacuum heating step S12 of generating and removing the first volatile component from the skin materials 14 by placing the skin materials 14 in the bag 22 and heating the skin material in a state where the inside of the bag 22 is evacuated and the outside of the bag 22 is under the atmospheric pressure for a predetermined time in the region of a low temperature in a case where the thermosetting resin contains the first volatile component generated in the region of a temperature lower than the curing temperature at which the thermosetting resin is cured. For this reason, since the method for manufacturing a structure, the method for preparing a skin material, and the method for setting a heating condition for a skin material according to the second embodiment of the present invention allow reduction of the first volatile component, which is generated from the skin materials 14 and is locked up and remains inside the skin materials 14, regardless of the fact that whether or not the holes are formed in the core material 12, the high-quality structure 10, which can reduce a possibility of generation of pores (voids) inside the skin materials 14, can be manufactured. In addition, since the method for manufacturing a structure, the method for preparing a skin material, and the method for setting a heating condition for a skin material according to the second embodiment of the present invention include only one time of the sealing pressurizing heating step S6 of performing heating and pressurizing with the use of the sealing pressurizing heating facility 30 in manufacturing one structure 10 regardless of the fact that whether or not the holes are formed in the core material 12 as in the method for manufacturing a structure according to the first embodiment of the present invention, the core material 12 and the skin materials 14 can be suitably bonded to each other without significantly decreasing a manufacturing efficiency.

In the second vacuum heating step S14 of the method for manufacturing a structure, the method for preparing a skin material, and the method for setting a heating condition for a skin material according to the second embodiment of the present invention, the skin materials 14 are placed in the bag 22 and the skin materials are heated in a state where the inside of the bag 22 is evacuated and the outside of the bag 22 is under the atmospheric pressure at a temperature that is equal to or lower than the curing temperature in a case where the thermosetting resin further contains the second volatile component generated in the region of a high temperature including the curing temperature. For this reason, since the method for manufacturing a structure, the method for preparing a skin material, and the method for setting a heating condition for a skin material according to the second embodiment of the present invention allow half-curing of the skin materials 14 in a state where the second volatile component is not generated regardless of the fact that whether or not the holes are formed in the core material 12, the second volatile component which is generated from the skin materials 14 and is locked up and remains inside the skin materials 14 can be reduced. Therefore, the high-quality structure 10, which can further reduce a possibility of generation of pores (voids) inside the skin materials 14, can be manufactured.

The method for manufacturing a structure, the method for preparing a skin material, and the method for setting a heating condition for a skin material according to the second embodiment of the present invention allow optimization of heating conditions of the first vacuum heating step S12 and the second vacuum heating step S14 based on two determination results obtained by performing thermal gravimetric analysis on the thermosetting resin. For this reason, since the method for manufacturing a structure, the method for preparing a skin material, and the method for setting a heating condition for a skin material according to the second embodiment of the present invention allow reduction of a variety of volatile components, which are generated from the skin materials 14 and are locked up and remain inside the skin materials 14, regardless of the fact that whether or not the holes are formed in the core material 12, the high-quality structure, which can more reliably reduce a possibility of generation of pores (voids) inside the skin materials 14, can be manufactured.

Figure 12:
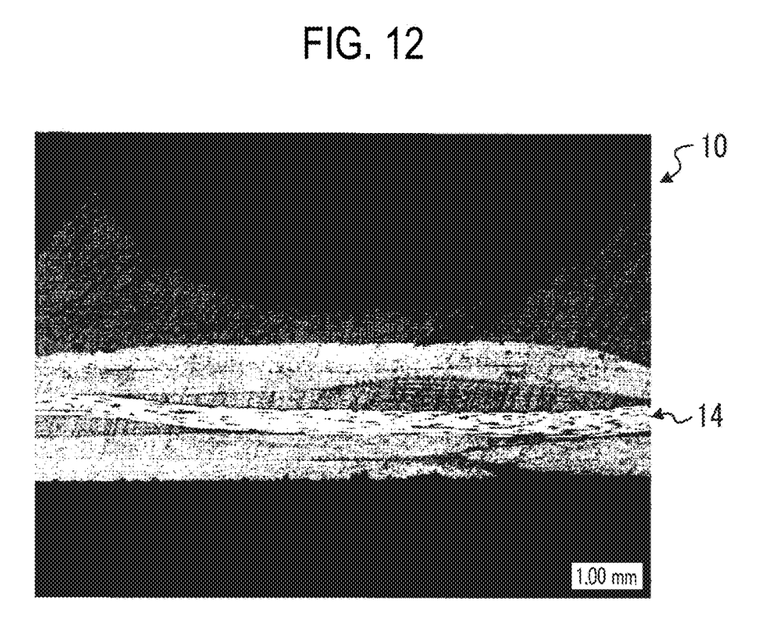
FIG. 12 is an example of a photo of a section of the skin material of the structure manufactured through a method for manufacturing a structure according to the second embodiment of the present invention, which is taken by an optical microscope.
Figure 13:
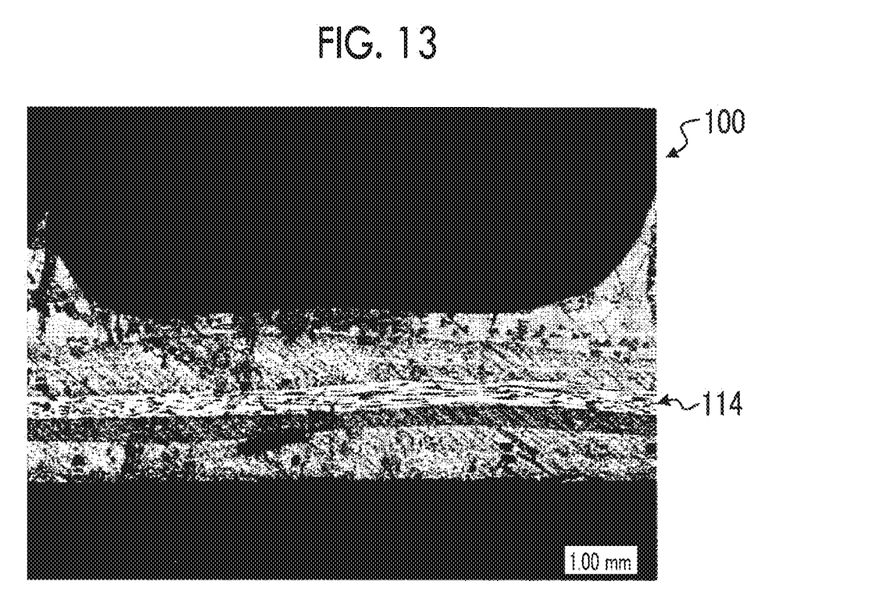
FIG. 13 is an example of a photo of a section of a skin material of a structure manufactured through a method for manufacturing a structure according to a comparative example, which is taken by an optical microscope.

FIG. 12 is an example of a photo of a section of the skin material 14 of the structure 10 manufactured through the method for manufacturing a structure according to the second embodiment of the present invention, which is taken by an optical microscope. That is, the skin material 14 illustrated in the sectional view of FIG. 12 is bonded and integrated with the core material 12 after going through processing of generating and removing the first volatile component in the first vacuum heating step S12 and processing of half-curing such that the second volatile component is not generated to an extent possible in the second vacuum heating step S14. FIG. 13 is an example of a photo of a section of a skin material 114 of a structure 100 manufactured through a method for manufacturing a structure according to a comparative example, which is taken by an optical microscope. The skin material 114 illustrated in the sectional view of FIG. 13 is bonded and integrated with the core material 12 without going through processing in the vacuum heating step S2 according to the first embodiment or the second embodiment.

As illustrated in FIG. 12, it can be seen that pores (voids) are not generated inside the skin material 14. On the contrary, as illustrated in FIG. 13, it can be seen that multiple pores (voids) are generated inside the skin material 114. From the comparison between the skin material illustrated in FIG. 12 and the skin material 114 illustrated in FIG. 13, it is possible to confirm that a possibility of generation of pores (voids) inside the skin materials 14 is reduced in the first vacuum heating step S12 and the second vacuum heating step S14 in the method for manufacturing a structure according to the second embodiment of the present invention.

REFERENCE SIGNS LIST 10, 100: structure
12: core material
12a: surface
14, 114: skin material
14a: plate material
16: adhesive layer
20: vacuum heating facility
22: bag
30: sealing pressurizing heating facility
41, 43, 44, 46, 51, 52, 53: curve
42: extremely low viscosity region
47: first region
48: second region
55: temperature profile
56: first vacuum heating region
57: second vacuum heating region

The invention claimed is:

1. A method for manufacturing a structure including a core material and a skin material stacked on a surface of the core material,
wherein the skin material includes a thermosetting resin containing
a first volatile component generated in a region of a temperature lower than a curing temperature at which the thermosetting resin is cured, and a second volatile component generated in a region of a high temperature including the curing temperature, and the method comprises:
- generating and removing the first volatile component from the skin material by placing the skin material in a bag and heating the skin material in a state where an inside of the bag is evacuated and an outside of the bag is under an atmospheric pressure for a predetermined time in the region of a low temperature;
- half-curing the thermosetting resin from which the first volatile component is removed by placing the skin material in the bag and heating the skin material in a state where the inside of the bag is evacuated and the outside of the bag is under the atmospheric pressure after the generating and removing;
- stacking the skin material in which the thermosetting resin is half-cured onto a side of the surface of the core material; and
- bonding and integrating the core material and the skin material with each other by pressurizing and heating the stacked core material and skin material with the use of a sealing pressurizing heating facility, wherein the generating and removing and the half-curing are set based on a determination result in which whether or not the thermosetting resin contains the first volatile component generated in the region of the temperature lower than the curing temperature at which the thermosetting resin is cured is determined and a determination result in which whether or not the thermosetting resin contains the second volatile component generated in the region of the high temperature including the curing temperature is determined, by performing thermal gravimetric analysis on the thermosetting resin.

2. The method for manufacturing the structure according to claim 1, wherein
   in the half-curing, the thermosetting resin from which the first volatile component is removed is half-cured by heating the skin material at a temperature that is equal to or lower than the curing temperature.

3. The method for manufacturing the structure according to claim 1,
   wherein in the stacking, the skin material in which the thermosetting resin is half-cured is stacked onto the side of the surface of the core material via a film-shaped adhesive layer, and
   in the bonding and integrating, the core material and the skin material are bonded and integrated with each other by the adhesive layer.

\* \* \* \* \*